Patented Aug. 17, 1954

2,686,786

UNITED STATES PATENT OFFICE 2,686,786

N-HYDROXY-2-PYRIDINETHIONES AND METHOD OF PREPARING SAME

Elliott N. Shaw, New York, N. Y., and Jack Bernstein, New Brunswick, N. J., assignors to Mathieson Chemical Corporation, New York, N. Y., a corporation of Virginia No Drawing. Application January 9, 1953, Serial No. 330,576

10 Claims. (Cl. 260—294.8)

This application is a continuation-in-part of our application Serial No. 159,646, filed May 2, 1950, now abandoned.

This invention relates to, and has for its object the provision of: [A] pyridinethiones of the general formula

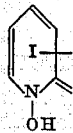

wherein R represents a member of the group consisting of hydrogen, lower alkyl, (lower alkyl)-oxy and halo; [B] alkali salts thereof, i. e., alkali-metal (including ammonium) and alkaline-earth-metal salts of these pyridinethiones; [C] methods of preparing these compounds; and [D] novel intermediates formed in these methods. The pyridinethiones A, salts B, and certain of the intermediates D are valuable chemotherapeutic agents.

Compounds of the above general formula may be in tautomeric equilibrium with the corresponding N-oxide, i. e.

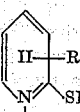

wherein R represents the group indicated hereinbefore. This tautomerism will not be alluded to hereinafter, it being understood that such tautomeric form (e. g., 2-mercaptopyridine-1-oxide) is included when referring to the compounds of this invention either by a formula such as I, or by a name such as N-hydroxy-2-pyridinethione.

The compounds of this invention may be obtained by converting a compound of the general formula

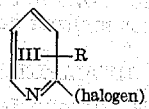

into the corresponding N-oxide, R representing the group indicated hereinbefore, and reacting the N-oxide formed with a member of the group consisting of alkali-metal sulfides, alkali-metal hydrosulfides, and thiourea—preferably by reacting the N-oxide with an alkali-metal hydrosulfide in water; and where the alkali salts are desired, by reacting the resulting pyridinethione with the appropriate base, e. g., sodium carbonate.

The novel intermediates formed in accordance with this invention are comprised by the general formulae

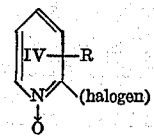

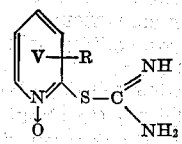

R representing the group indicated hereinbefore. These intermediates are recoverable in the form of their acid-addition salts, especially hydrohalides.

The N-oxides of the general Formula IV hereinbefore may be obtained by reacting a compound of the general Formula III hereinbefore with a per-acid, such as perbenzoic acid or peracetic acid.

The compounds of this invention are active against a wide group of microorganisms, as indicated by the following in vitro spectrum of the representative sodium salt of N-hydroxy-2-pyridinethione:

TABLE I

Antibacterial spectrum

| Organism: | M. I. C. in μg/ml. |
|---|---|
| Micrococcus pyogenes var. aureus 209P | 0.13 |
| Klebsiella pneumoniae | 1.5 |
| Pseudomonas aeruginosa | 4.0 |
| Streptococcus faecalis | 0.5 |
| Shigella dysenteriae | 0.5 |
| Streptococcus pyogenes C–203 | 0.25 |
| Salmonella schottmülleri | 2.5 |
| Aerobacter aerogenes | 3.5 |
| Escherichia coli | 2.5 |
| Proteus vulgaris | 0.7 |
| Mycobacterium tuberculosis var. bovis Strain BCG | 0.006 |
| Salmonella typhosa | 1.5 |
| Lactobacillus acidophilus | 0.4 |
| Clostridium septicum | 0.4 |
| Brucella abortus | 0.4 |
| Neisseria catarrhalis | 0.6 |
| Corynebacterium pyogenes | 0.3 |
| Streptococcus agalactiae | 0.08 |
| Bacillus subtilis | 0.06 |

TABLE II

Antifungal spectrum

|  | M. I. C. in μg/ml. of agar |
|---|---|
| Aspergillus niger | 0.6 |
| Aspergillus fumigatus | 0.3 |
| Penicillum notatum | 0.3 |
| Ceratostomella ulmi | 0.08 |
| Trichophyton mentogrophytes No. 1920 | 1 |
| Trichophyton mentogrophytes Squibb | 0.15 |
| T. tonsurans | 1 |
| T. rubrum | 1 |
| T. schoenleini | 0.5 |
| T. violaceoum | 2 |
| T. faviforme var. discoides | 0.03 |
| T. faviforme var. ochraceum | 0.03 |
| Microsporum audouini | 0.3 |
| M. audouini (Kligman strain) | <0.06 |
| M. canis | 1 |
| Epidermophyton flocossum | 0.25 |
| Sacch. cerevisiae | 0.08 |
| S. pastorianus | 0.04 |
| Candida albicans | 0.08 |
| Cryptococcus neoformans | 0.10 |

Illustrating utilization of the compounds of this invention as chemotherapeutic agents, the sodium salt of N-hydroxy-2-pyridinethione may be formulated and used as follows:

Chemotherapeutic nasal decongestant solution, containing per cc. water:
  50-100 gamma sodium salt of N-hydroxy-2-pyridinethione
  2.5 mg. phenylephrine hydrochloride
  Phosphate buffer (to about pH 7)
  Chlorbutanol (as preservative)

Administration: Intranasally, by drops (e. g., a few drops every four hours), or by nebulizer or gauze pack, for symptomatic relief of acute rhinitis, vasamotor rhinitis and nasopharyngitis.

The following examples are illustrative of the invention (all melting points recorded being uncorrected, and all solutions referred to without identification of solvent being solutions in water:)

EXAMPLE 1

*Preparation of N-hydroxy-2-pyridinethione*

(a) 35 g. 2-bromo-pyridine is added to a solution of 38 g. perbenzoic acid (20% molar excess) in 600 ml. chloroform, and the solution is allowed to stand for 4 days. The reaction mixture is then extracted three times with 150 ml. portions of 20% hydrochloric acid solution, and the (combined) acid extract is evaporated to dryness in vacuo. The residue (2-bromo-pyridine-N-oxide hydrochloride) is recrystallized from alcohol-ether, yielding about 28 g. of the product melting at about 135-136° C.

(b) A solution of 3.3 g. 2-bromo-pyridine-N-oxide-hydrochloride in 5 ml. water is heated on a steam bath while a solution of 4.1 g. sodium sulfide nonahydrate in 20 ml. water is added in 3 portions at 20-minute intervals. After heating for an additional half hour, the reaction mixture is cooled and acidified to Congo red with 20% hydrochloric acid solution, yielding 1.1 g. of a solid precipitate melting at 68-70° C. The precipitate is dissolved in 10 ml. normal sodium hydroxide solution; and the solution is filtered free of a small amount of sulfur and slowly acidified to Congo red with normal hydrochloric acid solution. The product (N - hydroxy - 2 - pyridinethione) is obtained as colorless crystals melting at about 68° C. in a yield of about 0.68 g. [It is noted that this product may also be named 1-hydroxy-2-(1H) pyridinethione.]

[Alternatively, the 2-bromo-pyridine-N-oxide hydrochloride intermediate is obtained as follows: 150 g. 40% peracetic acid (peracetic in acetic acid) is added slowly to 79 g. 2-bromo-pyridine, while maintaining the temperature below 15° C., and such temperature is maintained for an additional hour. The reaction mixture is then heated to 45–50° C. or 24 hours, and concentrated to half volume at 2–3 mm. (bath temperature 30° C.), and the residue is poured onto cracked ice, made strongly alkaline with 40% potassium hydroxide solution at 5° C., and then extracted three times with 300 ml. portions of chloroform. The (combined) chloroform extract is then extracted three times with 300 ml. portions of 20% hydrochloric acid solution, and the (combined) aqueous extract is concentrated to dryness under reduced pressure. The residue, after recrystallization from alcohol-ether, weighs about 61 g., melts at about 127–130° C., and shows no depression of melting point with 2-bromo-pyridine-N-oxide hydrochloride obtained as described in a.]

EXAMPLE 2

*Preparation of N-hydroxy-3-ethoxy-2-pyridinethione*

(a) A solution of 28 g. 2-bromo-3-ethoxy-pyridine hydrobromide in 200 ml. water is made strongly alkaline by addition of 40% potassium hydroxide solution, and the free base formed is extracted three times with 150 ml. portions of chloroform. The (combined) chloroform solution is dried, and added to a solution of 16.6 g. perbenzoic acid in 300 ml. chloroform; and the reaction mixture is allowed to stand at room temperature for 3 days, and then extracted three times with 150 ml. portions of 20% hydrochloric acid solution. The (combined) aqueous extract is concentrated to dryness under reduced pressure, yielding about 13 g. of 2-bromo-3-ethoxy-pyridine-N-oxide hydrochloride melting at about 158–160° C. On recrystallization from ether, the melting point of the product is raised to about 159–160° C.

(b) A solution of 30 g. 2-bromo-3-ethoxy-pyridine-N-oxide hydrochloride in 200 ml. water is neutralized with 25% sodium hydroxide solution; and to this solution is added a solution of 20 g. of sodium hydrosulfide in 100 ml. water while heating on a steam bath. The reaction mixture is heated for 1 hour, and filtered; the filtrate is cooled and acidified to Congo red with 20% hydrochloric acid solution; and the crystals formed (N-hydroxy-3-ethoxy-2-pyridinethione) are recovered by filtration. About 19 g. of the product is obtained, melting at about 97–100° C. On recrystallization from aqueous alcohol, about 17.5 g. of a product melting at about 101–103° C. is obtained.

EXAMPLE 3

*Preparation of N-hydroxy-5-bromo-2-pyridinethione*

(a) A solution of 21.2 g. 2,5-dibromo-pyridine in 50 ml. chloroform is added to a solution of 15.6 g. perbenzoic acid in 270 ml. chloroform. After standing 4 days at room temperature, the reaction mixture is extracted three times with 200 ml. portions of 20% hydrochloric acid solution; and the (combined) aqueous extract is concentrated to dryness, yielding about 4.5 g. of 2,5-dibromo-pyridine-N-oxide hydrochloride melting at about 161–162° C. On recrystallization from absolute alcohol, the melting point of the product is raised to about 165–166° C.

(b) A solution of 3.35 g. 2,5-dibromo-pyridine-N-oxid hydrochloride in 25 ml. water is neutralized with 25% sodium hydroxide solution; and a solution of 3 g. sodium hydrosulfide (70%) in 50 ml. water is added, and the reaction mixture is heated for 1 hour on a steam bath. The reaction mixture is then filtered and cooled; the filtrate is acidified to Congo red with 10% hydrochloric acid solution; and the precipitate (N-hydroxy-5-bromo-2-pyridinethione) is recovered. The product, obtained in a yield of about 1 g., melts at about 120–123° C.; and on recrystallization from aqueous alcohol, about 600 ml. of a product melting at about 130–131° C. is obtained.

EXAMPLE 4

*Preparation of N-hydroxy-3-methyl-2-pyridinethione*

(a) A solution of 37.8 g. 2-bromo-3-methylpyridine in 50 ml. chloroform is added to a solution of 39.4 g. perbenzoic acid in 1300 ml. chloroform. After standing at room temperature for 3 days, the reaction mixture is extracted three times with 300 ml. portions of 20% hydrochloric acid solution; and the (combined) aqueous extract is concentrated to dryness under reduced pressure, yielding about 33 g. 2-bromo-3-methylpyridine-N-oxide hydrochloride, melting at about 177–179° C. with decomposition. On recrystallization from absolute alcohol, the product melts at about 179–180° C. with decomposition.

(b) A solution of 8.5 g. 2-bromo-3-methylpyridine-N-oxide hydrochloride in 50 ml. water is neutralized with 25% sodium hydroxide solution, and a solution of 7 g. sodium hydrosulfide (70%) in 50 ml. water is added thereto, and the reaction mixture is heated for an hour on a steam bath. The reaction mixture is then filtered and cooled; and the filtrate is acidified to Congo red with 20% hydrochloric acid solution, yielding about 2.8 g. N-hydroxy-3-methyl-2-pyridinethione melting at about 71–73° C. On recrystallization from aqueous alcohol, the product melts at about 74–75° C.

EXAMPLE 5

*Prevention of N-hydroxy-4-methyl-2-pyridinethione*

(a) A solution of 20.8 g. 2-bromo-4-methylpyridine in 50 ml. chloroform is added to a solution of 23 g. perbenzoic acid in 400 ml. chloroform, and the reaction mixture is allowed to stand at room temperature for 3 days. The solution is then extracted three times with 100 ml. portions of 20% hydrochloric acid solution and the (combined) acid extract is concentrated to dryness under reduced pressure, yielding about 22 g. 2-bromo-4-methyl-pyridine-N-oxide hydrochloride melting at about 138–141° C. On recrystallization from absolute alcohol, about 16.5 g. of a product melting at about 147–148° C. is obtained.

(b) A solution of 16.5 g. 2-bromo-4-methylpyridine-N-oxide hydrochloride in 30 ml. water is neutralized with 25% sodium hydroxide solution, and a solution of 11.8 g. sodium hydrosulfide (70%) in 30 ml. water is added thereto portionwise. The reaction mixture is then heated for an hour on a steam bath, filtered, and cooled; and the filtrate is acidified to Congo red with 20% hydrochloric acid solution, yielding about 6 g. N-hydroxy-4-methyl-2-pyridinethione melting at about 59–61° C. On recrystallization from aqueous alcohol, about 3 g. of a product melting at about 62–63° C. is obtained.

EXAMPLE 6

*Preparation of N-hydroxy-5-methyl-2-pyridinethione*

(a) A solution of 43 g. 2-bromo-5-methylpyridine [B. P. 97° C./14 mm., M. P. 42–43° C.; obtained by a method analogous to that described in J. Am. Chem. Soc. 71, 72 (1949) for the preparation of 2-bromo-4-methyl-pyridine] in 100 ml. chloroform is added to a solution of 46 g. perbenzoic acid in 620 ml. chloroform. After standing for 4 days, the reaction mixture is extracted three times with 300 ml. portions of 20% hydrochloric acid solution; and the (combined) acid extract is concentrated to dryness under reduced pressure, yielding about 36 g. 2-bromo-5-methyl-pyridine-N-oxide hydrochloride melting at about 145–148° C. On recrystallization from absolute alcohol, the product melts at about 141–142° C.

(b) A solution of 6 g. 2-bromo-5-methyl-pyridine-N-oxide hydrochloride in 50 ml. water is neutralized with 25% sodium hydroxide solution, and a solution of 43 g. sodium hydrosulfide (70%) in 50 ml. water is added thereto, and the reaction mixture is heated for an hour on a steam bath. The reaction mixture is then filtered, and cooled; and the filtrate is acidified to Congo red with 20% hydrochloric acid solution, yielding about 2 g. N-hydroxy-5-methyl-2-pyridinethione melting at about 101–104° C. On recrystallization from aqueous alcohol, the product melts at about 106–107° C.

EXAMPLE 7

*Preparation of N-hydroxy-6-methyl-2-pyridinethione*

(a) A solution of 43 g. 2-bromo-6-methylpyridine in 100 ml. chloroform is added to a solution of 42 g. perbenzoic acid in 625 ml. chloroform, and the reaction mixture is allowed to stand at room temperature for 3 days. The reaction mixture is then extracted three times with 300 ml. portions of 20% hydrochloric acid solution; and the (combined) acid extract is concentrated to dryness under reduced pressure, yielding about 34 g. 2-bromo-6-methyl-pyridine-N-oxide hydrochloride melting at about 185–186° C. with decomposition. On recrystallization from absolute alcohol, the product melts at about 185–186° C.

(b) A solution of 21 g. 2-bromo-6-methyl-pyridine-N-oxide hydrochloride in 150 ml. water is neutralized with 25% aqueous sodium hydroxide solution; and a solution of 15 g. sodium hydrosulfide (70%) in 100 ml. water is added thereto, and the reaction mixture is heated for an hour on a steam bath. The reaction mixture is then filtered, and cooled; and the filtrate is acidified to Congo red with 20% hydrochloric acid solution, yielding about 6.1 g. N-hydroxy-6-methyl-2-pyridinethione melting at about 51–54° C. On recrystallization from aqueous alcohol, the product melts at about 52–54° C.

EXAMPLE 8

*Alternative preparation of N-hydroxy-2-pyridinethione*

(a) A solution of 9.7 g. thiourea in 250 ml. ethyl alcohol and a solution of 19.4 g. 2-bromo-pyridine-N-oxide hydrochloride [obtained as described in Example 1 (a)] in 100 ml. ethyl alcohol are refluxed together for an hour, a precipitate being formed almost immediately. The precipitate, recovered by filtration, weighs about 18 g., melts at about 160–160.5° C. with decomposition, and does not change its melting point on recrystallization from absolute alcohol. The product is presumably that of the following structural formula

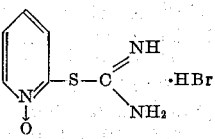

(b) A solution of 10 g. sodium carbonate in 125 ml. water is added to 12.5 g. of the product obtained in (a) of this example, and the resulting solution is allowed to stand for 4 hours. The solution is then made just acid to Congo red with 20% hydrochloric acid solution, and the resulting precipitate filtered off. The precipitate, N-hydroxy-2-pyridinethione, weighs about 5 g. and melts at about 65–67° C.; and the absence of melting-point depression indicates it to be identical with the product obtained as described in Example 1.

Other compounds of the general Formula I hereinbefore may be obtained by starting with the appropriate reactant (of general Formula III hereinbefore) in the procedure of the foregoing examples. Thus obtainable are compounds: where R is a lower alkyl other than methyl (ethyl, propyl, inter alia); where R is a (lower alkyl)-oxy other than ethoxy (methoxy, for example), or is a (lower alkyl)-oxy in position 4, 5 or 6; and where R is chloro, for example, or is a halo in position 3, 4, or 6.

EXAMPLE 9

18.6 g. sodium carbonate monohydrate is dissolved in 500 ml. water, and 38.6 g. N-hydroxy-2-pyridinethione is added; the reaction mixture is agitated to otain complete solution, and filtered; and the filtrate is freeze-dried. The sodium salt of N-hydroxy-2-pyridinethione obtained in quantative yield gives the following analysis: C, 40.12; H, 2.95; and Na, 15.34.

Sodium bicarbonate or sodium hydroxide may be used in place of the sodium carbonate.

EXAMPLE 10

A suspension of 1.27 g. N-hydroxy-2-pyridinethione and 0.856 g. barium hydroxide in 150 ml. water is agitated at room temperature until complete solution occurs; and the solution is freeze dried, yielding about 2 g. of the barium salt of N-hydroxy-2-pyridinethione.

EXAMPLE 11

12.7 g. N-hydroxy-2-pyridinethione is added to a solution of 6.9 g. potassium carbonate in 120 ml. water, and the resulting solution is freeze-dried, quantitatively yielding the potassium salt of N-hydroxy-2-pyridinethione.

EXAMPLE 12

1 g. N-hydroxy-2-pyridinethione is added to 50 ml. of 3.7 N alcoholic ammonia. There is a change in crystalline form of the solid; and after the mixture has been standing a half hour, the solid is filtered off. The ammonium salt of N-hydroxy-2-pyridinethione thus obtained in a yield of about 1 g. melts at 151–153° C.; and after recrystallization from 80 ml. absolute alcohol, it melts at 155–156° C.

EXAMPLE 13

A suspension of 1.41 g. N-hydroxy-4-methyl-2-pyridinethione and 0.375 g. calcium hydroxide in 100 ml. of water is agitated at room temperature until complete solution occurs; and the solution is freeze-dried, quantitatively yielding the calcium salt of N-hydroxy-4-methyl-2-pyridinethione.

The invention may be variously otherwise embodied within the scope of the appended claims.

We claim:

1. Compounds of the group consisting of: compounds of the general formula

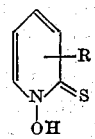

wherein R represents a member of the group consisting of hydrogen, lower alkyl, (lower alkyl)-oxy and halo; and alkali salts thereof.

2. Compounds of the general formula

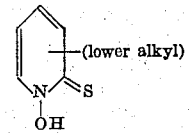

3. N-hydroxy-2-pyridinethione.

4. The sodium salt of N-hydroxy-2-pyridinethione.

5. The method which comprises interacting a compound of the general formula

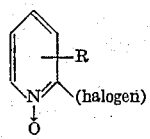

R representing a member of the group consisting of hydrogen, lower alkyl, (lower alkyl)-oxy and halo, with a member of the group consisting of alkali-metal sulfides, alkali-metal hydrosulfides, and thiourea, by heating in a solvent for the reactants, and recovering the reaction product.

6. The method which comprises interacting a compound of the general formula

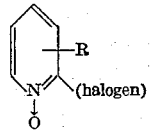

R representing a member of the group consisting of hydrogen, lower alkyl, (lower alkyl)-oxy and halo, with an alkali-metal hydrosulfide, by heating in water, and recovering the reaction product.

7. The method which comprises interacting a compound of the general formula

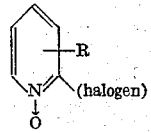

R representing a member of the group consisting of hydrogen, lower alkyl, (lower alkyl)-oxy and halo, with thiourea, by heating in alcohol, and recovering the reaction product.

8. An acid-addition salt of a compound of the general formula

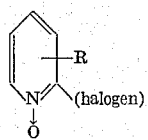

wherein R represents a member of the group consisting of hydrogen, lower alkyl, (lower alkyl)-oxy, and halo.

9. An acid-addition salt of a compound of the general formula

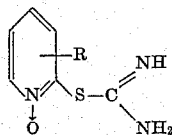

wherein R represents a member of the group consisting of hydrogen, lower alkyl, (lower alkyl)-oxy, and halo.

10. An alkali salt of N-hydroxy-2-pyridinethione.

References Cited in the file of this patent

UNITED STATES PATENTS

| Number | Name | Date |
|---|---|---|
| 1,753,658 | Kochendoerfer | Apr. 8, 1930 |

OTHER REFERENCES

Thirtle, J. A. C. S., vol. 68, pp. 342-3, (1946).
Itai, Chem. Abstr., vol. 44, pp. 4473-4, (1950).